Feb. 7, 1967 H. G. STULTS 3,302,737
WEIGHER-CONTROLLED FEED DISPENSING DEVICE PROVIDING
PREDETERMINED FEEDING SCHEDULE
Original Filed Feb. 14, 1964 2 Sheets-Sheet 1

INVENTOR:
HOWARD G. STULTS
BY
ATTORNEY.

Feb. 7, 1967  H. G. STULTS  3,302,737
WEIGHER-CONTROLLED FEED DISPENSING DEVICE PROVIDING
PREDETERMINED FEEDING SCHEDULE
Original Filed Feb. 14, 1964  2 Sheets-Sheet 2

INVENTOR:
BY HOWARD G. STULTS
ATTORNEY.

United States Patent Office 3,302,737
Patented Feb. 7, 1967

3,302,737
WEIGHER-CONTROLLED FEED DISPENSING DEVICE PROVIDING PREDETERMINED FEEDING SCHEDULE
Howard G. Stults, Hettick, Ill. 62649
Original application Feb. 14, 1964, Ser. No. 344,926, now Patent No. 3,261,416, dated July 19, 1966. Divided and this application May 23, 1966, Ser. No. 552,250
6 Claims. (Cl. 177—114)

This application is a division of copending application Serial No. 344,926, filed February 14, 1964, now Patent No. 3,261,416, issued July 19, 1966, of the same inventor and more particularly covers the embodiment of the device disclosed in FIGS. 6 and 7 of the drawings.

The present invention relates generally to weighing and feeding devices and more particularly to a combination weighing and feeding device for feeding livestock and the like.

Many devices have been constructed and used in the past for feeding livestock, and some have included means for feeding measured quantities of feed. Existing devices, however, vary widely in construction and operation and most of the existing devices require frequent attention and adjustment and many require considerable manual labor and relatively skilled personnel to operate. So far as known, no one has heretofore devised or constructed a livestock feeding device which is fully automatic, which weighs predetermined amounts of feed, and which feeds the measured quantities at predetermined time intervals. Furthermore, no known device also includes means for blending and mixing different feeds and feed supplements to achieve the most desirable feed mixture. Still further, it has been the usual practice heretofore to feed relatively large quantites at relatively infrequent intervals to reduce the labor and time required in the feeding of animals. This practice, however, usually does not achieve the most desirable or efficient use of the feed and does not result in the best feeding schedule for the animals. In recent years, the trend has been to feed smaller amounts at more frequent intervals in order to get the most efficient use of the feed and also to provide a better feeding schedule. It is obvious, however, that more frequent feeding, especially if it is done manually, will require considerably more labor in the mixing, blending and distribution of the feed thereby substantially increasing the labor cost and also results in more waste of the feed.

These and other disadvantages and shortcomings are inherent in all of the known methods and devices for feeding animals and are overcome by the present invention which teaches the construction and operation of a novel feed weigher device which can be regulated to feed at any desired time intervals and which includes means for automatically mixing, blending, weighing and feeding the animals. Furthermore, the subject device can be made fully automatic requiring only relatively infrequent attention by a relatively unskilled operator, as for example, when new supplies of bulk feed and feed supplements are required and for normal maintenance and cleaning.

It is therefore a major object of the present invention to provide improved means for feeding livestock.

Another object is to provide improved means for mixing, weighing, blending and feeding substances to animals.

Another object is to provide means for feeding animals according to the most desirable feeding schedule.

Another object is to provide animal feeding means which are fully automatic and may include means for mixing feed supplements with bulk feed materials to obtain the most desirable feed mixture thereof.

Another object is to provide improved feed weighing means which are adjustable to change the amount of feed weighed thereby.

Another object is to reduce the cost of feeding farm animals and the like.

Another object is to increase the meat producing efficiency of animal feeds and the like.

Another object is to provide animal feed means capable of being adjusted to produce the most desirable feeding schedule for a particular kind of animal.

Another object is to provide means whereby a portion of the main bulk feed is weighed before one or more supplements are added thereto.

Yet another object is to minimize waste of materials used for feeding animals.

These and other objects and advantages of the present invention will become apparent after considering the following detailed specification covering several preferred embodiments of the device in conjunction with the accompanying drawings, wherein.

The structure shown in FIGS. 1–5 of the subject drawings are fully described in the copending application Serial No. 344,926, now U.S. Patent No. 3,261,416, issued July 19, 1966.

Figures 6, 7:
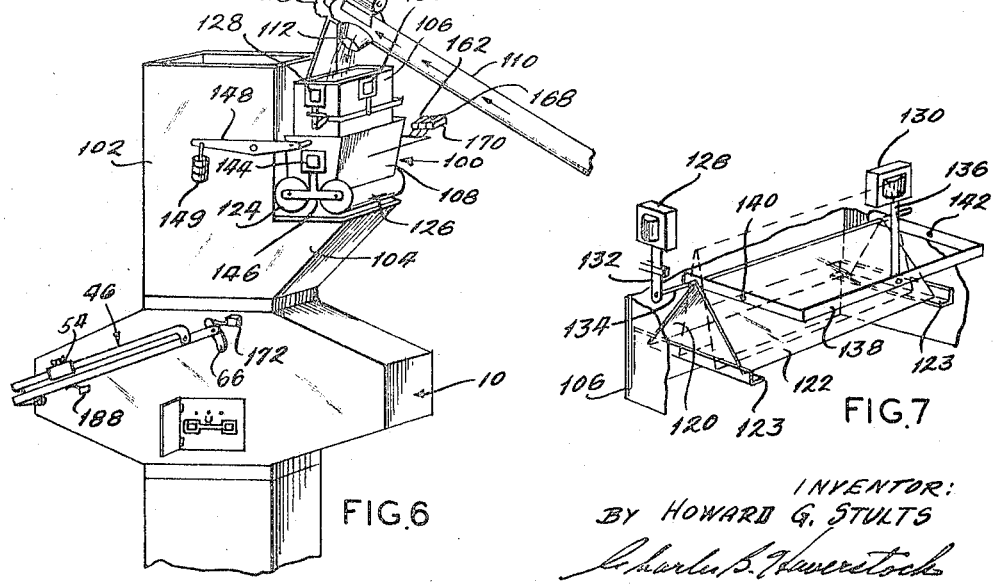
FIG. 6 is a perspective view showing the subject feed weighing device in combination with an auxiliary feed weighing device.
FIG. 7 is an enlarged perspective view showing a portion of the operating mechanism for the auxiliary feed weighing device of FIG. 6; and, FIG. 8 is a schematic wiring diagram of a typical control circuit for the subject device.

FIG. 6 shows the subject feed weighing device 10 in combination with an auxiliary device 100 which supplies a feed supplement to the incoming bulk feed material to produce a more desirable feed mixture. The auxiliary device 100 weighs out predetermined amounts of a feed supplement and at an appropriate time, feeds the said predetermined amounts to the device 10 where it is blended and mixed with the bulk feed before the bulk feed is released to fall into the feed trough. The auxiliary means are mounted on the side of the input feed chute 102 to the device 10, and more than one similar feed supplement device can be provided as desired for supplying measured amounts of several different supplements. The auxiliary device 100 like the main feed weighing device 10 can be fully automatic requiring only minimum attention by an operator such as for purposes of refilling the supply bins therefor, adjusting the amount of feed supplement to be added to each batch of bulk feed, and general cleaning and maintaining said device as required. The device 100 can also be used independently of the device 10, as for example, as a hog feeder.

The feed supplement device 100 is shown mounted over a sloping chute 104 which is attached to the side of the main chute 102 and empties into the main chute 102. The device 100 includes upper and lower housing portions 106 and 108 respectively, and the upper housing portion 106 is open at the top to receive feed supplement fed thereto by an auger device 110 which has a discharge opening 112 thereabove. The auger feed device 110 may be of conventional construction having a rotatable helical auger mounted in a tube, and the lower end of the feed device or tube 110 is positioned near the bottom of a suitable supply bin that contains bulk supplement. The auger for the feed device is driven by a motor 114 and by suitable gears 116 and 118.

The upper housing portion 106 also has a pair of sloping bottom shutter walls 120 and 122 positioned therein as shown in FIG. 7. The shutters slide on space ledges 123 in the housing 106, and when the walls 120 and 122 are in the position shown in solid outline in FIG. 7 the bottom of the housing portion 106 is closed and when the shutters are in the dotted position the bottom of the housing portion 106 is open. The ledge members 123 can also be formed of sloping portions to facilitate sliding movement of the shutter members 120 and 122 therealong. When a predetermined amount of feed supplement is fed into the upper housing portion 106 by the auger 110, weighing means will be actuated to energize means that move shutter walls 120 and 122 to the position shown in the dotted outline in FIG. 7. The feed supplement will then fall into the lower housing portion 108 onto a pair of semi-cylindrical shaped shutter members 124 and 126 which close the bottom thereof. The shutter members 120 and 122 are controlled by two solenoid operators 128 and 130 which are mounted on the sides of the housing portion 106. The solenoid operator 128 has an armature 132 which is connected to one end of a shaft 134 that is movable in curved slots in the ends of the housing portion 106, and is also hingedly connected to adjacent upper side edges of the shutter wall members 120 and 122. When the solenoid 128 is energized the armature 132 moves the shaft 134 upwardly in the housing 106 to the dotted position in FIG. 7 and in so doing discharges feed supplement into the lower housing portion 108. The shutters 120 and 122 also keep a supply of the supplement available in the upper housing 106 so that the auger motor 114 does not have to be restarted each time a new amount of supplement is to be weighed in the lower housing 108. The shutters also give a clean cutoff of the supplement after each weighing operation is satisfied thereby preventing waste and facilitating more accurate weighing.

The solenoid operator 130 is mounted on one side of the housing 106 and has an armature 136 that is connected to a U-shaped equalizer bracket member 138. The bracket 138 is pivoted to the housing portion 106 at points 140 and 142, and is also connected to opposite ends of the shaft 134. When the solenoid 130 is energized, it moves the connected portion of the U-shaped member 138 upwardly thereby forcing the shaft 134 downwardly to reclose the bottom of the upper housing portion 106 in readiness for the next weighing operation. The solenoid 128 therefore controls the opening of the housing portion 106 and the solenoid 130 controls the closing thereof. The control circuits for the solenoids 128 and 130 will be described later in connection with FIG. 8.

Another solenoid 144 is mounted on the end wall of the lower housing portion 108 and its armature 146 is eccentrically connected to two rotatable shutter members 124 and 126 which open and close the bottom thereof. The solenoid 144 has two operating coils 145 and 147 one of which is energized to close the shutter members 124 and 126 and the other to open the shutter members. When the solenoid coil 145 is energized the armature 146 moves upwardly rotating the eccentric connections thereof with the shutters 124 and 126 and moving the shutters to their closed positions. When the solenoid coil 147 is energized, however, the armature 146 moves downwardly to open the shutters to allow the contents of the lower housing 108 to discharge into the chutes 102 and 104. It is also contemplated to mount the shutters 124 and 126 in reverse positions on the housing 108 so that their outer surfaces instead of their inner surfaces close the bottom thereof and support the load. The operating mechanism for this reverse condition can be similar to that disclosed and therefore need not be described.

The bottom housing portion 108 is supported by suitable weighing means such as pivoted levers 148 and weights 149 as shown in FIG. 6. The housing portion 108 also operates certain limit switches which will be described later and which control the operation of the solenoids 128, 130 and 144.

The device 100 can be operated at any time to measure or weigh a predetermined quantity of feed supplement, and can also be controlled as to when the feed supplement will be fed into the feed weigher device 10. Normally, the most desirable time to empty the feed supplement into the feed weighing device 10 is when the device 10 is approximately half full because then the supplement will be fairly near the middle of the bulk feed and will better distribute itself therewith when the bulk feed falls through the outlet 16. It is also contemplated to provide a rotating paddle wheel or mixing device (not shown) in the outlet chute to the feed weigher 10 to even more thoroughly mix the feed supplement with the bulk feed.

As already noted, the feed supplement weighing device can also be operated with other weighing devices or independently, if desired. In such cases, some structural and electrical changes may be required and some components, such as the operator 130 and associated parts may be eliminated or relocated. For example, the operator 130 could be replaced by a suitable weight device attached to the member 138 to close the shutter members 120 and 122 under certain conditions. Other changes can also be made.

Figure 1:
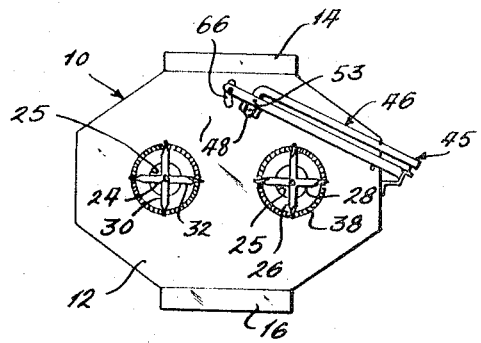
FIG. 1 is a side elevational view of a feed weigher device constructed according to the present invention.
Figure 2:
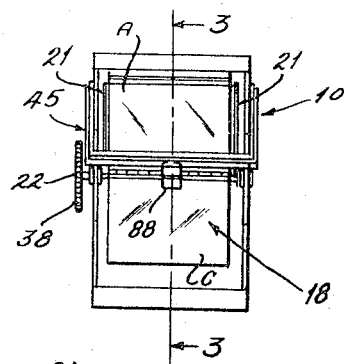
FIG. 2 is a right end elevational view of the device shown in FIG. 1.
Figure 3:
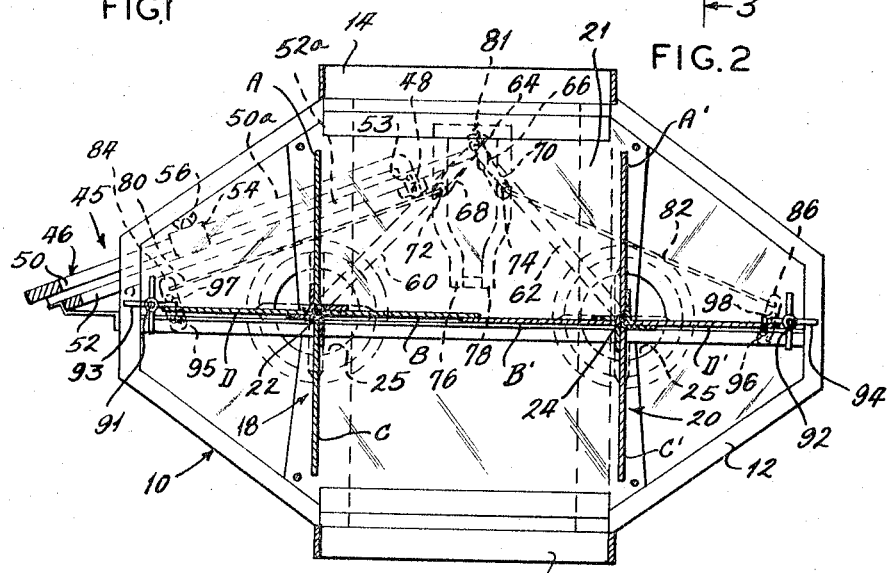
FIG. 3 is an enlarged cross-sectional elevational view taken along line 3—3 of FIG. 2.
Figure 4:
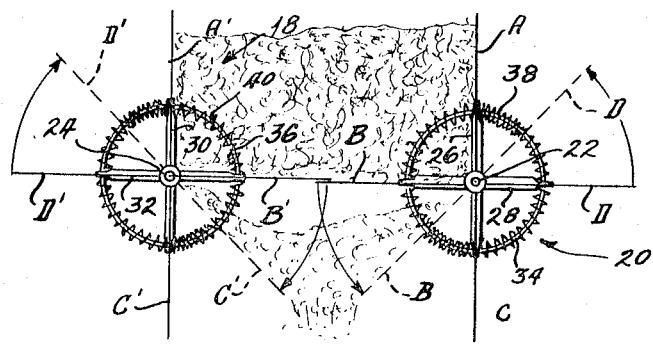
FIG. 4 is a diagrammatic view illustrating several different positions of the feed weighing and supporting elements of the subject device.
Figure 5:
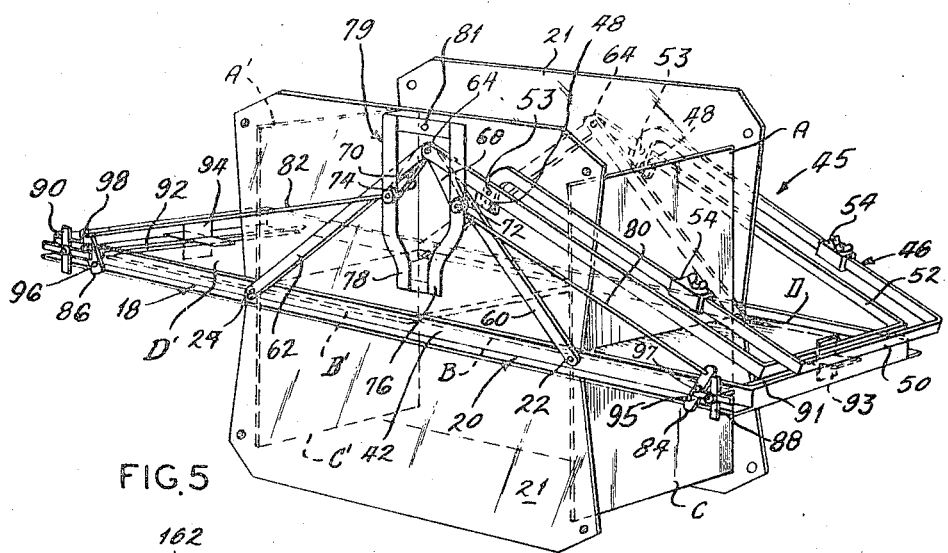
FIG. 5 is an enlarged perspective view showing the operating mechanism for the feeding and weighing portions of the subject device.
Figure 8:
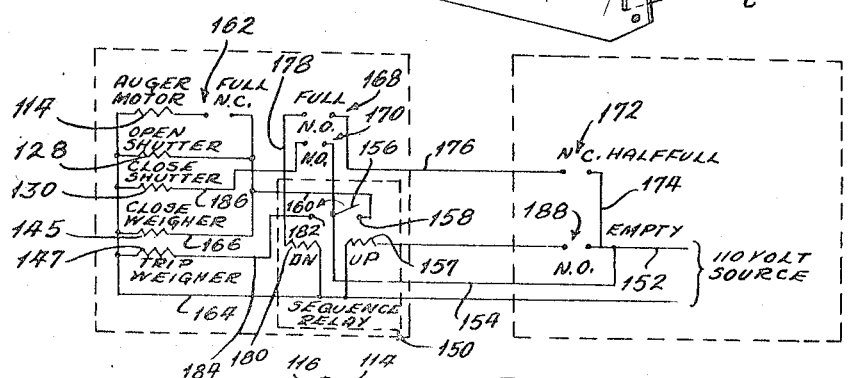

FIG. 8 shows a circuit for operating the feed weigher devices 10 and 100. The circuit is connected to an appropriate source of voltage and includes circuits to operate the solenoids 128, 130 and 144, the auger 110, and another similar auger device (not shown) which controls the input of bulk feed to the main feed weigher 10. The circuit may also include a sequence relay and a timing device. Operation of the circuit is controlled by mechanical limit switches positioned to respond to predetermined movements of the various mechanisms. If the device 10 is to be used without supplement additive means a simpler circuit than is shown in FIG. 8 can be used involving merely timing means and switch means for controlling the bulk feed source.

Initiation of an operating cycle where both the devices 10 and 100 are employed is more complicated and is controlled by a timing device (not shown) which closes a switch (not shown) from a power source to the present circuit. The timing device can be of conventional construction and can be energized to initiate the circuit on any preset schedule. Once the circuit is energized a sequence relay 150 and a plurality of limit switches take over to automatically feed and weigh a predetermined quantity of bulk feed which may be mixed with one or more feed supplements. The mixture is then fed to a manger or other feed trough. At the beginning of each operation, the auger from the silo or such to the main feed weigher device 10 is energized to feed bulk feed to the main weigher device 10. At this time, a normally open switch, which is now closed because the weigher is empty, establishes a circuit for energizing solenoid coils 128 and 145 and the auger motor 114. Thus when the auger motor 114 starts the solenoid 128 opens the shutters 120 and 122 and allows the incoming supplement to pass through into the weigher housing 108 which is now closed at the bottom. This continues until such time as the weighing means associated therewith are satisfied that the desired amount of supplement is in the housing 108 at which time the shutters 120 and 122 will be closed and thereafter the auger motor will be deenergized.

The circuit for energizing the motor 114 is from the main power source on leads 152 and 154 to the sequence relay terminal 156 which is now connected to the relay terminal 158 because the relay coil 157 was last energized and the relay has only two alternate operating positions, then on lead 160 to and through the normal closed limit switch contacts 162 which are in series with the auger motor 114, and back on lead 164 to the opposite side of the voltage source. This causes feed supplement to be fed into the device 100. At the same time, the shutter members 120 and 122 in the upper stationary housing portion 106 are open because the solenoid 128 is energized, being connected in parallel across a circuit which includes the auger motor 114 and the normal closed limit switch contact 162. This allows the incoming feed supplement to fall through the upper housing portion 106 into the lower housing portion 108 as aforesaid and onto the shutter members 124 and 126 which are now closed because the solenoid 145 is also energized being connected in parallel with the solenoid coil 128. The circuit that energizes the solenoid 145 includes leads 152 and 154, relay terminals 156 and 158 which are closed, leads 160 and 166, to and through the solenoid coil 145 and back to the opposite side of the voltage source on lead 164. This continues until the normally closed limit switch 162 is opened due to predetermined downward movement of the lower housing portion 108 as feed supplement accumulates therein. When the limit switch 162 is actuated by predetermined downward movement of the housing portion 108 the auger 114 will stop. The stopping of the auger motor 114 need not occur exactly at the time that the housing portion 108 has the predetermined measured amount of feed in it but preferably will continue to operate for a longer time to partially fill the upper housing portion 106 even after the shutters 120 and 122 are closed.

When the housing portion 108 is in its predetermined filled condition as determined by the weighing means including limit switches 168 and 170 associated therewith, the solenoid 130 will be energized to close the shutters 120 and 122 and thereafter the auger motor 114 will stop. The device 100 will then wait for the appropriate time to discharge its load. The appropriate time in the present device occurs when the device 10 is approximately one-half full of bulk feed as determined by actuation of a normally closed one-half full limit switch 172 which is positioned on the device 10 and controlled by movement of the weighing arm assembly 46. The contacts of the limit switch 172 are also adjusted to close when the device 10 is approximately half loaded and are connected in series with the limit switch 168 which at the time is also closed because of the full condition of the housing portion 108. When these two conditions exist a circuit is established on lead 174, the contacts of limit switch 172, lead 176, the contacts of the limit switch contacts 168, and lead 178 to and through relay winding 180 of the sequence relay 150. The energizing of the relay winding 180 causes the movable relay terminal 156 to move from its position contacting the stationary terminal 158 to its other position contacting stationary terminal 182 to establish a circuit from the source on leads 152 and 154 to the terminals 156 and 182, lead 184 to the weigher solenoid trip coil 147 which is mounted on the solenoid 144. When the solenoid trip coil 147 is energized it opens the movable shutters 124 and 126 at the bottom of housing portion 108 and discharges the previously measured quantity of feed supplement into the chutes 102 and 104. This occurs, as already mentioned, when the main weigher device 10 is approximately half full.

Prior to the time that the coil of the trip weigher solenoid 147 is energized, another circuit is established through the normally opened limit switch 170 to close the shutters 120 and 122 in the upper housing portion 106. This circuit is from the source on leads 152 and 154 to and through the contacts of limit switch 170 which are now closed and then on lead 186 to and through the closed shutter solenoid 130 and back to the voltage source on the lead 164.

Thereafter, after the device 10 has been emptied by operation of the weighing means 45, a normally open limit switch 188 under control of the weighing means 46 will be closed to establish a circuit for reenergizing the sequence relay coil 157 to reset the relay 150 in preparation for the next succeeding cycle. The sequence relay is constructed to remain in the condition in which it was last energized until the other coil thereof is energized. The limit switch 188 is actuated by the weighing means 46 after they have returned to their empty position at the conclusion of an unloading operation. The locations of the switches 168 and 188 are shown in FIG. 6.

The auger motor 114 and the shutter open solenoid 128 will be reenergized by the reclosing of the normally closed limit switch 162 after the device 10 is empty in preparation for the next cycle. After the lower housing portion 108 has been filled the shutters 120 and 122 may again be closed by the contacts of the limit switch 170 and the operation will not be repeated until the next time the auger for the main weigher device is energized under control of a timing means.

As already noted, the entire sequence of operation is carefully controlled and timed by the sequence relay, the limit switches and timing means all of which can be adjusted to produce the most desirable operation conditions. It should also be noted that the various parts of the subject circuit are fully interlocked to prevent malfunction should trouble develop. This is highly desirable in a device such as this where waste could otherwise occur rapidly. Many variations and changes in the circuit, in the circuit timing, and in the method and sequence of operation are possible and are clearly within the scope of the invention, and it is not intended to limit the invention to the particular embodiment and the particular operation and sequence of operation hereinabove disclosed.

Thus there has been shown and described novel feed weighing means which fulfill all of the objects and advantages sought therefor. Many changes, modifications and alterations of the subject device, however, will become apparent to those skilled in the art after considering this specification and the accompanying drawings which disclose only preferred embodiments thereof. All such changes, modifications and alterations which do not depart from the spirit and scope of the invention are deemed to be covered by the invention which is limited only by the claims which follow.

What is claimed is:

1. Means for weighing predetermined amounts of feed material or the like comprising a first housing including an inlet, controlled inlet feed means for feeding material into the first housing, a second housing movable relative to the first housing and positioned to receive and accumulate feed material fed into said first housing, a portion of said first housing extending into the second housing, means associated with said second housing for weighing feed material as it accumulates therein, said weighing means including means supporting said second housing for substantially vertical movement, and means including electrical control means for releasing material accumulated in said second housing at predetermined times and in response to the accumulation of a predetermined weight of material therein as determined by the weighing means, said electrical control means also including means for controlling the inlet feed means.

2. Means for weighing predetermined quantities of feed or the like comprising a first housing having an inlet positioned to receive feed material fed thereto from a controlled feed source, means for closing the first housing so that material fed thereto from the feed source can accumulate therein, means for opening said closure means to release material accumulated in said first housing, a second housing positioned to receive and accumulate material from said first housing, means for weighing material as it accumulates in the second housing, and means for releasing material from said second housing when a predetermined weight of material has accumulated therein, said release means including time controlled means and means responsive to the accumulation of a predetermined weight of feed material in said second housing.

3. Means for weighing predetermined amounts of feed material or the like comprising a first housing including an inlet, controlled inlet feed means for feeding material into the first housing, a second housing movable relative to the first housing and positioned to receive and accumulate feed material fed to said first housing, at least a portion of said first housing being positioned in said second housing, means associated with said second housing for weighing feed material as it accumulates therein, said weighing means including means for supporting said second housing for movement relative to the first housing, and means including an electrical control means for controllably releasing material that accumulates in said second housing, said means including timer means and means responsive to the accumulation of a predetermined weight of material therein as determined by the weighing means, said electrical control means including means for controlling the inlet feed means.

4. Means for weighing predetermined amounts of granular material comprising a stationary housing having an inlet, inlet means for feeding granular material into the stationary housing through the inlet, controllable closure means in the first housing to cause material to accumulate therein, means for moving the closure means to an open position to allow material accumulated therein to discharge, a second housing positioned to receive material discharged from the first housing and from the inlet feed means, means movably supporting said second housing including means to weigh the material that accumulates therein, means responsive to the accumulation of a predetermined weight of material in the second housing for releasing the material that has accumulated therein, and means for restoring the release means to a position closing the second housing after the material is discharged therefrom.

5. The means defined in claim 4 including means for moving the closure means associated with the first housing to a closed position at about the same time the second housing is being discharged.

6. The means defined in claim 4 wherein said first housing extends into said second housing.

References Cited by the Examiner

UNITED STATES PATENTS

| 2,299,636 | 10/1942 | Mansbendel | 177—85 |
| 2,717,143 | 9/1955 | McCargar | 177—85 |
| 3,202,230 | 8/1965 | Brichard | 177—114 X |

FOREIGN PATENTS

| 649,657 | 10/1962 | Canada. |
| 1,272,205 | 8/1961 | France. |
| 952,365 | 3/1964 | Great Britain. |

RICHARD B. WILKINSON, *Primary Examiner.*

R. S. WARD, *Assistant Examiner.*